United States Patent
Wu et al.

(10) Patent No.: US 8,806,246 B1
(45) Date of Patent: Aug. 12, 2014

(54) ENFORCING AND COMPLYING WITH A COMPUTING DEVICE POWER POLICY

(75) Inventors: Jojo Wu, Taipei (TW); Fay Li, Taipei (TW); Marco Wu, Taipei (TW); Charles Huang, Taipei (TW)

(73) Assignee: Crimson Corporation, Dover, DE (US)

( * ) Notice: Subject to any disclaimer, the term of this patent is extended or adjusted under 35 U.S.C. 154(b) by 555 days.

(21) Appl. No.: 13/101,936

(22) Filed: May 5, 2011

Related U.S. Application Data

(60) Provisional application No. 61/331,727, filed on May 5, 2010.

(51) Int. Cl.
*G06F 1/26* (2006.01)
*G06F 15/173* (2006.01)

(52) U.S. Cl.
USPC ........... 713/322; 713/320; 713/323; 713/324; 713/330; 709/220; 709/223; 709/224; 455/205

(58) Field of Classification Search
USPC .......... 713/320, 322, 324, 340; 709/220, 223, 709/224; 455/205
See application file for complete search history.

(56) References Cited

U.S. PATENT DOCUMENTS

| | | | | |
|---|---|---|---|---|
| 6,189,106 B1* | 2/2001 | Anderson | ...................... | 713/300 |
| 6,654,895 B1* | 11/2003 | Henkhaus et al. | ............ | 713/320 |
| 2010/0138678 A1* | 6/2010 | Huang | ........................... | 713/320 |
| 2011/0150431 A1* | 6/2011 | Klappert | ....................... | 386/296 |

* cited by examiner

*Primary Examiner* — M Elamin

(74) *Attorney, Agent, or Firm* — Austin Rapp & Hardman

(57) ABSTRACT

A computing device configured for enforcing a computing device power policy is described. The computing device includes a processor and executable instructions stored in memory that is in electronic communication with the processor. The computing device generates a power policy. The computing device also sends the power policy. The computing device further receives a suspicious process alert. Additionally, the computing device determines whether to terminate a suspicious process. The computing device also sends a process termination command if it is determined to terminate the suspicious process.

20 Claims, 8 Drawing Sheets

ENFORCING AND COMPLYING WITH A COMPUTING DEVICE POWER POLICY

RELATED APPLICATIONS

This application is related to and claims priority from U.S. Provisional Patent Application Ser. No. 61/331,727, filed May 5, 2010, for "SOFTWARE FOR ENFORCING CLIENT COMPUTERS TO COMPLY WITH PRE-DEFINED POWER POLICIES," which is incorporated herein by reference.

TECHNICAL FIELD

The present disclosure relates generally to computers and computer-related technology. More specifically, the present disclosure relates to enforcing and complying with a computing device power policy.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On a network, one or more servers may provide data, services and/or may be responsible for managing other computers. The managed computers are often referred to as managed nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Computing devices consume electrical energy or power. One current challenge is controlling and monitoring the energy or power consumption of computing devices. For example, a company that uses many computing devices may be concerned about computing devices that waste power by running when they are not in use. As can be observed from this discussion, systems and methods that help control and/or monitor the energy or power consumption of computing devices may be beneficial.

DETAILED DESCRIPTION

Figure 1:
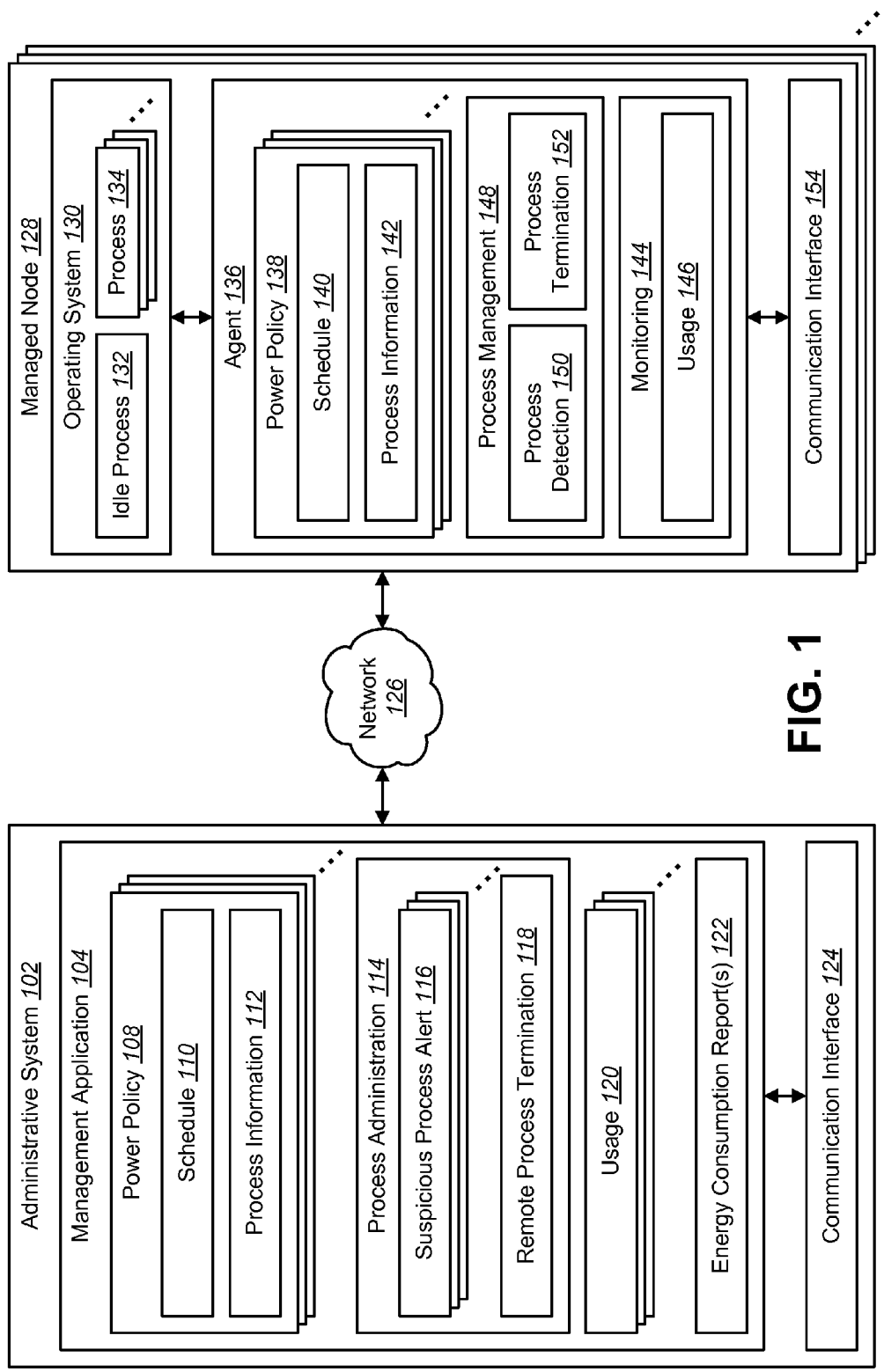
FIG. 1 is a block diagram illustrating one configuration of an administrative system and one or more managed nodes in which systems and methods for enforcing and complying with a computing device power policy may be implemented.

A computing device configured for enforcing a computing device power policy is disclosed. The computing device includes a processor and instructions stored in memory that is in electronic communication with the processor. The computing device generates a power policy. The computing device also sends the power policy. The computing device additionally receives a suspicious process alert. Furthermore, the computing device determines whether to terminate a suspicious process. The computing device also sends a process termination command if it is determined to terminate the suspicious process. The computing device may send the power policy according to a deployment schedule or a policy group. Determining whether to terminate the suspicious process may be based on a received input.

The computing device may also receive a usage record. Additionally, the computing device may generate an energy consumption report based on the usage record. The computing device may further adjust the energy consumption report based on a consumption factor adjustment.

A computing device configured for complying with a computing device power policy is also disclosed. The computing device includes a processor and instructions stored in memory that is in electronic communication with the processor. The computing device receives a power policy. The computing device also determines whether to enter a power save mode based on the power policy and any suspicious process. If it is determined to enter the power save mode, the computing device enters the power save mode. Furthermore, if it is determined to enter the power save mode, the computing device determines whether to enter an active mode. The computing device enters the active mode if it is determined to enter the active mode. The computing device may be disconnected from a network after receiving the power policy. The computing device may monitor usage. The computing device may also send usage information.

Determining whether to enter the power save mode based on the power policy and any suspicious process may include determining whether it is time to enter the power save mode. Determining whether to enter the power save mode based on the power policy and any suspicious process may also include determining whether a process is running that prevents entering the power save mode if it is time to enter the power save mode. Determining whether to enter the power save mode based on the power policy and any suspicious process may additionally include determining whether the process is a sensitive process if the process is running that prevents entering power save mode. Furthermore, determining whether to enter the power save mode based on the power policy and any suspicious process may include determining whether to terminate the process if the process is not the sensitive process and terminating the process if it is determined to terminate the process. If it is determined that the process is not the sensitive process, then the computing device may send a suspicious process alert.

A method for enforcing a computing device power policy by a computing device is also disclosed. The method includes generating a power policy. The method also includes sending the power policy. The method additionally includes receiving a suspicious process alert. Furthermore, the method includes determining whether to terminate a suspicious process. The method also includes sending a process termination command if it is determined to terminate the suspicious process.

A method for complying with a computing device power policy by a computing device is also disclosed. The method includes receiving a power policy. The method also includes determining whether to enter a power save mode based on the power policy and any suspicious process. If it is determined to enter the power save mode, the method additionally includes entering the power save mode. If it is determined to enter the power save mode, the method also includes determining whether to enter an active mode and entering the active mode if it is determined to enter the active mode.

The systems and methods disclosed herein describe enforcing compliance with predefined power policies for client computing devices. For example, a software program may enforce compliance with predefined power policies by forcing computers to enter power-saving mode or by awaking machines before the start of a business hour. The compelling power policy may be deployed not only when a user is logged in but also at every hour of the day. To ensure that each computer can enter a power-saving mode, this software may raise an alert of suspicious processes. The suspicious processes may be terminated to cure personal computer (PC) insomnia. The software may also include an activity monitoring mechanism to derive a usage pattern of client computers. This may by used to generate a historical energy consumption report, which may help management understand achieved energy savings.

Several problems may be addressed or solved using the systems and methods disclosed herein. One problem is that a different power scheme with a group policy cannot be applied by working hour or by working day. Another problem is that some machines may stay awake while not in use. This condition may be referred to as PC insomnia. The inability to remotely wake up machines at a specific time if they are out of network is another problem addressed by the systems and methods disclosed herein. Another problem is that power saving may suspend or stop an important running application. A lack of a historical power consumption report to demonstrate the real power savings within a period of time is yet another problem addressed by the systems and methods disclosed herein.

Currently, many companies use a Windows group policy to create different power plans for different scenarios. In that approach, only one power setting can be applied at a time, which will not change until a new setting is reapplied. However, the systems and methods disclosed herein may automatically set a different power scheme based on a predefined schedule to ensure increased power savings after working hours.

Besides the systems and methods disclosed herein, other automatic solutions for solving the PC insomnia issue are unknown. According to the systems and methods disclosed herein, an insomnia alert and process-sensitive trigger mechanism may ensure that client machines enter sleep mode if there are no sensitive processes running and the system idle is lower than a predefined threshold. Any suspicious process causing the machine to stay awake may be logged into a management console. Once all the sensitive processes are not running and/or the suspicious processes are terminated, the systems and methods disclosed herein may place the computer into a power-saving mode.

Most traditional centralized remote wakeup functionality is based on Active Management Technology (AMT) or Wake-on-LAN (WOL) technology that requires the computer to be on the network. Any network problem may cause the remote wakeup to fail. One common network problem is that WOL cannot be forwarded to other subnets because it is a broadcast packet. However, the systems and methods disclosed herein may provide centralized remote wakeup capability by deploying a local wakeup time to the machine in advance. The computer may then wake itself up at the specified time no matter if the computer is online or offline.

It may be difficult to break down the power consumption of computers from a single electricity bill without an additional hardware device. However, the systems and methods disclosed herein may produce a historical report that provides a realistic energy cost calculated from the collected activities of each computer. An administrator may also adjust the power consumption of each device to reflect the real consumption of every computer. This report may help management understand how much energy was used by the computers and how much energy has been saved by using power management software that is implemented in accordance with the systems and methods disclosed herein.

Various configurations are now described with reference to the Figures, where like reference numbers may indicate identical or functionally similar elements. The present systems and methods, as generally described and illustrated in the Figures herein, could be arranged and designed in a wide variety of different configurations. Thus, the following more detailed description of several configurations of the present systems and methods, as represented in the Figures, is not intended to limit the scope of the systems and methods, as claimed, but is merely representative of the configurations of the systems and methods.

FIG. 1 is a block diagram illustrating one configuration of an administrative system 102 and one or more managed nodes 128 in which systems and methods for enforcing and complying with a computing device power policy may be implemented. The administrative system 102 may be a computing device that is used to enforce a computing device power policy 108. Examples of the administrative system 102 include desktop computers, laptop computers, supercomputers, servers, cellular phones, smartphones, tablet devices, e-readers, gaming devices, etc. The one or more managed nodes 128 may be computing devices used to comply with a power policy 138. Examples of the one or more managed nodes 128 include desktop computers, laptop computers, supercomputers, servers, cellular phones, smartphones, tablet devices, e-readers, gaming devices, etc.

The administrative system 102 may include a management application 104 and/or a communication interface 124. The management application 104 may comprise software, a program, computer instructions, code, etc., that is executed or runs on the administrative system 102. For example, instructions for the management application 104 may be stored in memory and executed by a processor on the administrative system 102 in order to execute or run the management application 104.

The communication interface 124 may comprise hardware and/or software used to communicate with other devices. For instance, the communication interface 124 may communicate with one or more managed nodes 128 on a network 126 using a wired and/or wireless link. Examples of the communication interface 124 include network cards, Ethernet adapters, Universal Serial Bus (USB) adapters, Bluetooth transceivers, Institute of Electrical and Electronics Engineers (IEEE) 802.11 (e.g., Wi-Fi) transceivers, 3rd Generation Partnership Project (3GPP)-compliant transceivers, Global System for Mobile Communications (GSM)-compliant transceivers, fiber optic modems, etc.

The management application 104 may be used to manage the energy or power consumption of one or more managed nodes 128 on the network 126. The management application 104 may include one or more power policies 108, a process administration module 114, one or more usage records 120 and/or one or more energy consumption reports 122.

A power policy 108 may comprise data and/or instructions that may be used to control and/or monitor the power or energy consumption of one or more managed nodes 128. The power policy 108 may include a schedule 110. The schedule 110 may indicate times and/or periods when a managed node 128 should enter a power save mode (e.g., a sleep mode) and/or when a managed node 128 should enter an active mode (e.g., awake mode). For example, the power policy 108 schedule 110 may indicate that a managed node 128 should enter a power save mode after 6:00 p.m. each business day and should enter an active mode at 6:00 a.m. each business day. In one configuration, this schedule 110 may be followed by a managed node 128 contingent upon one or more sensitive processes and/or possibly contingent upon one or more suspicious processes.

The power policy 108 may optionally include process information 112. Process information 112 may specify one or more processes as sensitive processes. For instance, a sensitive process may be designated according to file name (e.g., image name), owner (e.g., user name, system, local service, network service, etc.), etc. The process information 112 may optionally specify one or more processes as suspicious processes. For instance, a suspicious process may be designated according to file name (e.g., image name), owner (e.g., user name, system, local service, network service, etc.), etc. The administrative system 102 may send (e.g., deploy) one or more power policies 108 to one or more managed nodes 128 on the network. In some configurations, a power policy 108 may include other information, such as default rules for suspicious processes (e.g., whether to terminate or not terminate suspicious processes by default or in the event that a managed node 128 cannot communicate with the administrative system 102 when a suspicious process is detected).

In some configurations, one or more power policies 108 may be deployed (e.g., sent) according to a deployment schedule. For example, different power policies 108 may be deployed at different times during a day, week and/or year. For instance, a deployment schedule may deploy power policy A 108 during the business day, power policy B 108 after business hours and power policy C 108 on weekends.

In some configurations, one or more power policies 108 may be deployed according to one or more policy groups. For example, a policy group may specify one or more managed nodes 128. Thus, different power policies 108 may be deployed to different groups of managed nodes 128. For instance, power policy A 108 may be deployed to group A that includes 10 managed nodes 128, while power policy B 108 may be deployed to group B that includes 100 managed nodes 128. In some configurations, policy groups may overlap or may be exclusive. In the case where overlapping policy groups exist, particular power policies 108 may take priority over other power policies 108.

Each managed node 128 may include an operating system 130, an agent 136 and/or a communication interface 154. The communication interface 154 may comprise hardware and/or software used to communicate with other devices. For instance, the communication interface 154 may communicate with administrative system 102 on the network 126 using a wired and/or wireless link. Examples of the communication interface 154 include network cards, Ethernet adapters, Universal Serial Bus (USB) adapters, Bluetooth transceivers, Institute of Electrical and Electronics Engineers (IEEE) 802.11 (e.g., Wi-Fi) transceivers, 3rd Generation Partnership Project (3GPP)-compliant transceivers, Global System for Mobile Communications (GSM)-compliant transceivers, fiber optic modems, etc.

The operating system 130 may comprise software that is used to operate the managed node 128. Examples of operating systems 130 include Microsoft Windows, OS X, Linux, Unix, Android, iOS, etc. The operating system 130 may monitor an idle process 132 and one or more (other) processes 134. An idle process 132 may be used when processing cycles on the managed node 128 are not being requested from one or more other processes 134. Thus, the idle process 132 may provide a measure of processing activity on the managed node 128. The one or more processes 134 may represent one or more programs, applications or processes that are currently being processed (e.g., running) on the managed node 128. In some configurations, the agent 136 may query the operating system 130 for information regarding the idle process 132 and the one or more processes 134 (e.g., sensitive processes, suspicious processes, etc.). The operating system 130 may provide corresponding information to the agent 136, such as process names, file names, image names, percentage of processor usage, owner names (e.g., names of an entity that launched a process 134), etc.

The agent 136 may be an application or program that is used to perform operations on the managed node 128 at the direction of the administrative system 102. The agent 136 may receive one or more power policies 138 from the administrative system 102. A power policy 138 may comprise data and/or instructions that may be used to control and/or monitor the power or energy consumption of the managed node 128. The power policy 138 may include a schedule 140. The schedule 140 may indicate times and/or periods when a managed node 128 should enter a power save mode (e.g., a sleep mode) and/or when a managed node 128 should enter an active mode (e.g., awake mode). For example, the power policy 138 schedule 140 may indicate that the managed node 128 should enter a power save mode after 6:00 p.m. each business day and should enter an active mode at 6:00 a.m. each business day. In one configuration, this schedule 140 may be followed by a managed node 128 contingent upon one or more sensitive processes and/or possibly contingent upon one or more suspicious processes. For example, a managed node 128 may enter power save mode in accordance with a power policy 138 unless prevented by a sensitive process, a suspicious process or a user. If a suspicious process is terminated that was preventing the managed node 128 from entering power save mode, the managed node 128 may then enter power save mode. The managed node 128 may enter active mode according to the power policy 138.

The power policy 138 may optionally include process information 142. Process information 142 may specify one or more processes as sensitive processes. For instance, a sensitive process may be designated according to file name (e.g., image name), owner (e.g., user name, system, local service, network service, etc.), etc. The process information 142 may optionally specify one or more processes as suspicious processes. For instance, a suspicious process may be designated according to file name (e.g., image name), owner (e.g., user name, system, local service, network service, etc.), etc. It should be noted that in the case that the managed node 128 uses multiple power policies 138, that one power policy 138 may take priority over another power policy 138 and/or multiple power policies 138 may be used concurrently (where they are not inconsistent).

The process management module 148 may be used to detect and/or terminate one or more processes 134. For example, the process management module 148 may include a process detection module 150 and/or a process termination module 152. The process detection module 150 may detect one or more processes 134 that are running on the managed node 128.

The process management module 148 may classify the one or more processes 134 (and the idle process 132) as sensitive or suspicious. Processes that are not sensitive or suspicious may be disrupted, suspended or terminated and/or may not affect a managed node's 128 ability to enter power save mode. A sensitive process may be a high-priority, critical or user-specified process that should not be disrupted or suspended. Examples of sensitive processes may include running applications that are currently in use (where a user is interacting with the application, for example), firmware updates that should not be disrupted, simulation processes, data writing (to storage or disk, etc.) processes, hardware driver processes, intercommunication processes, some compilation processes, user-specified sensitive processes (e.g., applications) and/or other processes. Some sensitive processes may have particular owners (e.g., entities that launched the processes) and/or particular characteristics (e.g., certain file extensions, file names, etc.). Suspicious processes may be processes that keep a managed node 128 in an active state (e.g., awake) and that are not known or not designated as sensitive processes. For example, if a process 134 is consuming an amount of processing resources such that the idle process 132 resource consumption is not above a threshold that allows entering power save mode and the process 134 is not identified as a sensitive process, that process 134 may be deemed or designated as a suspicious process. Additionally or alternatively, a suspicious process may be detected based on identifying information (e.g., file name, image name, owner, user name, behavior, etc.) included in the process information 142. A suspicious process may waste energy if it keeps the managed node 128 in an active state when it is not performing useful tasks. However, a suspicious process may be performing a useful task that should not be disrupted.

The process management module 148 may classify the one or more processes 134 based on the process information 142 in the power policy 138. Additionally or alternatively, the managed node 128 may maintain a list of sensitive and/or suspicious processes. For example, the process detection module 150 may obtain a list of running processes 132, 134 from the operating system 130. The process management block/module 148 may compare the list of running processes 132, 134 to the process information 142 and/or a stored list of sensitive and/or suspicious processes. One or more processes 134 detected that are not designated as sensitive and that keep the managed node 128 in an active state may be designated as suspicious processes. Additionally or alternatively, if a process 134 matches suspicious processes indicated by the process information 142 or a stored list of suspicious processes, then the process 134 may be designated as a suspicious process.

In some configurations, the managed node 128 may send one or more suspicious process alerts 116 to the administrative system 102. The process administration module 114 may receive the one or more suspicious process alerts 116. A suspicious process alert 116 may indicate (e.g., identify) one or more processes that have been designated suspicious by a managed node 128. Additionally or alternatively, a suspicious process alert 116 may include information about characteristics of the suspicious process(es) (e.g., name, owner, processor resource consumption, start time, etc.). The process administration module 114 may determine whether or not the one or more suspicious processes indicated by the alert(s) 116 should be terminated.

Depending on the configuration of the systems and methods herein, one or more procedures may be followed in determining whether to terminate a suspicious process. For example, the administrative system 102 may present a suspicious process alert 116 to an administrator (e.g., user of the administrative system 102). In this case, the administrative system 102 may receive an input that indicates whether or not the suspicious process should be terminated. In another example, the administrative system 102 may include a list of suspicious processes, where each suspicious process has a directive. A directive may indicate whether the corresponding suspicious process should be terminated or not. Additionally or alternatively, the administrative system 102 may maintain one or more rules for suspicious processes. These rules may be default rules (e.g., terminate or do not terminate any unknown suspicious processes) or may be more specific (e.g., terminate or do not terminate any suspicious process with certain characteristics such as a certain extension, activity level, source, name, owner, etc.). The foregoing examples may be used independently and/or in combination, depending on the systems and methods disclosed herein. Furthermore, different procedures may be followed for different managed nodes 128 and/or groups of managed nodes 128.

If the process administration module 114 determines that a suspicious process should be terminated, it 114 may use a remote process termination module 118 to send a command to the managed node 128 (that is hosting the suspicious process) to terminate the suspicious process. The managed node 128 may then terminate the suspicious process using the process termination module 152. For example, the process termination module 152 may send a command to the operating system 130 to terminate the suspicious process. If the process administration module 114 determines that a suspicious process should not be terminated, the administrative system 102 may do nothing or may send a command or an indicator to the corresponding managed node 128 that the suspicious process should not be terminated. If the managed node 128 receives nothing in response to the suspicious process alert or receives a command or indicator that the suspicious process should not be terminated, then the managed node 128 may not terminate the suspicious process.

Each managed node 128 may include a monitoring module 144. The monitoring module 144 may be used to monitor the activity or usage of a managed node 128. For example, the monitoring module 144 may generate and/or maintain usage records 146 of the managed node 128. Usage records 146 may include information that may be used to determine or estimate the energy or power consumption of the managed node 128. Some examples of information that the usage records 146 may include are amounts of time that the managed node 128 has been in an active mode and/or power saving mode, an amount of processor usage or loading, kinds of peripherals attached to the managed node 128 (e.g., monitors, mice, keyboards, speakers, USB drives, portable music players (e.g., MP3 players, iPods, etc.)), how many peripherals are attached, how long the peripherals have been active and/or inactive, the kind of interface used with a peripheral (e.g., USB, Bluetooth, etc.), integrated device activity (e.g., how long a Blu-Ray drive/DVD/CD drive was in use, etc.), a device type (e.g., whether the managed node 128 is a desktop computer, laptop computer, smart phone, etc.), etc. Each managed node 128 may send usage records 146 to the administrative system 102 (if connected to the network 126, for example). The usage records 128 may be sent periodically, according to a schedule, on demand (e.g., upon request from the administrative system 102) and/or based on a trigger (e.g., a user logs off).

The administrative system 102 may receive one or more usage records 120 from the one or more managed nodes 128. The administrative system 102 may use the usage record(s) 120 to generate one or more energy consumption reports 122. For example, the administrative system 102 may use an algorithm to determine or estimate the amount of energy or power consumed by one or more managed nodes 128. In one configuration, the administrative system 102 may use an active mode power consumption factor and a power saving mode power consumption factor in conjunction with active mode times and power saving mode times indicated by usage records 120 to determine or estimate the energy consumption of each managed node 128. In some configurations, these power consumption factors may be adjusted by an administrator to better reflect the actual power consumption of a managed node 128.

Figure 2:
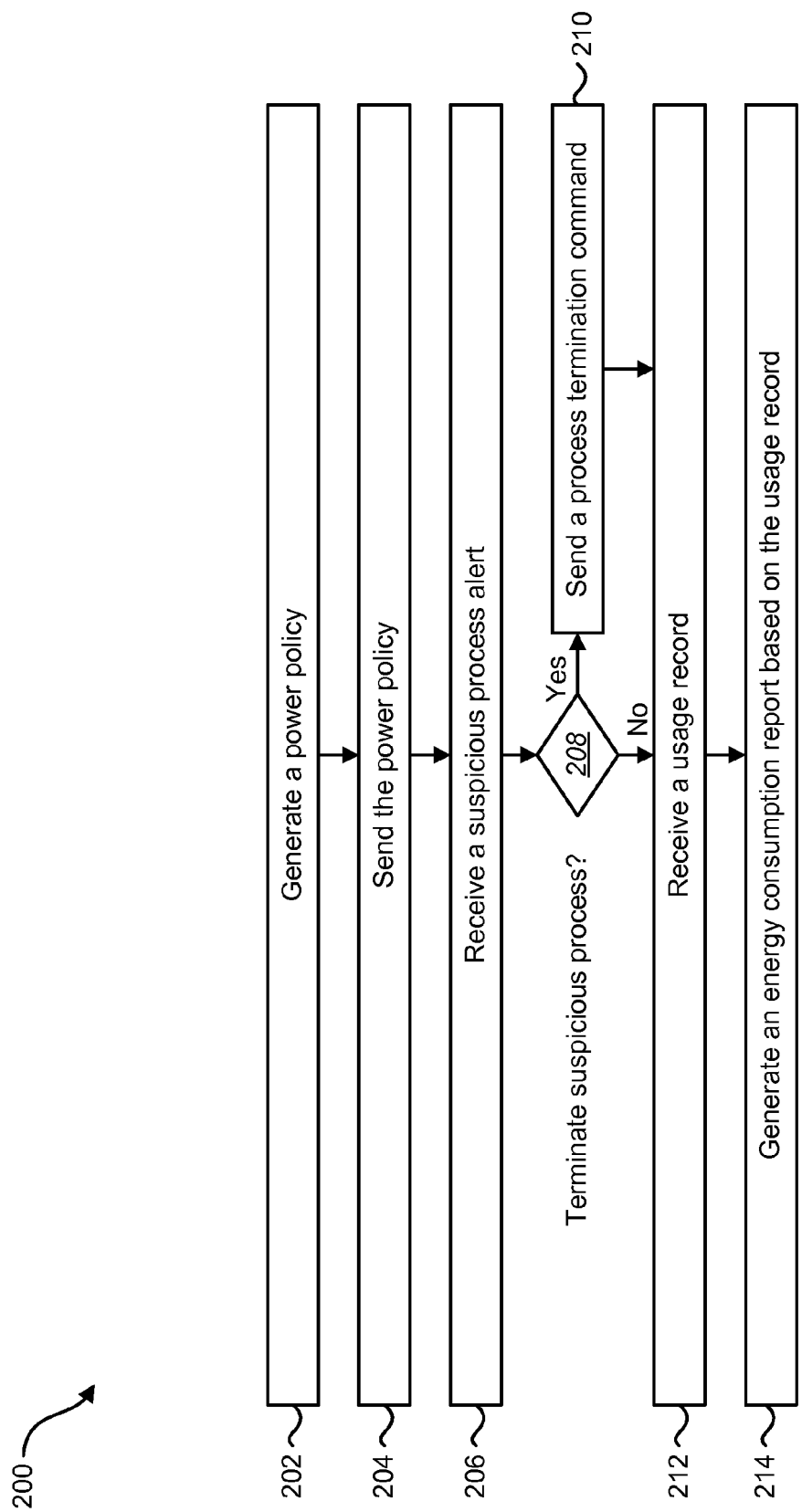
FIG. 2 is a flow diagram illustrating one configuration of a method for enforcing a computing device power policy.

FIG. 2 is a flow diagram illustrating one configuration of a method 200 for enforcing a computing device power policy. An administrative system 102 may generate 202 one or more power policies 108. For example, the administrative system 102 may generate a power policy 108 that specifies a schedule 110 for when a managed node 128 should enter a power save mode and/or when a managed node 128 should enter an active mode. The power policy 108 may additionally or alternatively include process information 112 that designates certain processes as sensitive or (optionally) suspicious. In some configurations, a power policy 108 may include other information, such as default rules for suspicious processes (e.g., whether to terminate or not terminate suspicious processes by default or in the event that a managed node 128 cannot communicate with the administrative system 102 when a suspicious process is detected).

The administrative system 102 may send 204 the one or more power policies 108. For example, the administrative system 102 may send 204 the power policy 108 to one or more managed nodes 128 over a network 126 using a communication interface 124. In some configurations, one or more power policies 108 may be sent 204 according to a deployment schedule. For example, the same or different power policies 108 may be sent 204 at different times during a day, week, month and/or year. For instance, the administrative system 102 may send 204 power policy A 108 during the business day, power policy B 108 after business hours and power policy C 108 on weekends. Additionally or alternatively, the administrative system 102 may send 204 one or more power policies periodically (e.g., each hour, after a number of minutes, etc.).

In some configurations, the administrative system 102 may send 204 one or more power policies 108 according to one or more policy groups. For example, a policy group may specify one or more managed nodes 128. Thus, different power policies 108 may be sent 204 to different groups of managed nodes 128. For instance, power policy A 108 may be sent 204 to group A that includes 10 managed nodes 128, while power policy B 108 may be sent 204 to group B that includes 100 managed nodes 128.

The administrative system 102 may receive 206 one or more suspicious process alerts 116. For example, the administrative system 102 may receive 206 one or more suspicious process alerts 116 from one or more managed nodes 128 across the network 126 using a communication interface 124. A suspicious process alert 116 may indicate one or more processes that have been designated suspicious by a managed node 128.

The administrative system 102 may determine 208 whether or not the one or more suspicious processes indicated by the alert(s) 116 should be terminated. Depending on the configuration of the systems and methods herein, one or more procedures may be followed in determining whether to terminate a suspicious process. For example, the administrative system 102 may present a suspicious process alert 116 to an administrator (e.g., user of the administrative system 102). In this case, the administrative system 102 may receive an input (from the administrator, for example) that indicates whether or not the suspicious process should be terminated. In another example, the administrative system 102 may include a list of suspicious processes, where each suspicious process has a directive. A directive may indicate whether the corresponding suspicious process should be terminated or not. Additionally or alternatively, the administrative system 102 may maintain one or more rules for suspicious processes. These rules may be default rules (e.g., terminate or do not terminate any unknown suspicious processes) or may be more specific (e.g., terminate or do not terminate any suspicious process with certain characteristics such as a certain extension, activity level, source, name, etc.). The foregoing examples may be used independently and/or in combination, depending on the systems and methods disclosed herein. Furthermore, different procedures may be followed for different managed nodes 128 and/or groups of managed nodes 128.

If the administrative system 102 determines 208 that a suspicious process should be terminated, it 102 may send 210 a process termination command. For example, the process termination command may be sent 210 to the managed node 128 that is hosting the suspicious process over the network 126 using a communication interface 124. If the administrative system 102 determines that a suspicious process should not be terminated, the administrative system 102 may optionally do nothing or may send a command or an indicator to the corresponding managed node 128 that the suspicious process should not be terminated.

The administrative system 102 may receive 212 one or more usage records 120. For example, the administrative system 102 may receive 212 one or more usage records 120 from one or more managed nodes 128. The administrative system 102 may generate 214 one or more energy consumption reports 122 based on the usage record(s) 120. For example, the administrative system 102 may use an algorithm to determine or estimate the amount of energy or power consumed by one or more managed nodes 128. In one configuration, the administrative system 102 may use an active mode power consumption factor and a power saving mode power consumption factor in conjunction with active mode times and power saving mode times indicated by usage records 120 to determine or estimate the energy consumption of each managed node 128. In some configurations, these power consumption factors may be adjusted by an administrator to better reflect the actual power consumption of a managed node 128.

In another example, the administrative system 102 may generate 214 an energy consumption report 122 using more detailed information. This more detailed information may be included in the usage report 120 and/or obtained from other sources, such as Internet websites, databases, local storage, external drives, etc. For instance, the administrative system 102 may use information such as amounts of time that the managed node 128 has been in an active mode and/or power saving mode, an amount of processor usage or loading, kinds of peripherals attached to the managed node 128 (e.g., monitors, mice, keyboards, speakers, USB drives, portable music players (e.g., MP3 players, iPods, etc.)), how many peripherals are attached, how long the peripherals have been active and/or inactive, the kind of interface used with a peripheral (e.g., USB, Bluetooth, etc.), integrated device activity (e.g., how long a Blu-Ray drive/DVD/CD drive was in use, etc.), a device type (e.g., whether the managed node 128 is a desktop computer, laptop computer, smart phone, etc.), kinds of device components (e.g., processor type, memory type, etc.), device component characteristics (e.g., processor speed, bus speed, etc.), etc.

It should be noted that receiving 212 a usage record 120 and/or generating 214 an energy consumption report 122 may occur at any time and do not need to follow step 208 or 210 as illustrated in FIG. 2. For example, the administrative system 102 may receive 212 a usage record 120 and/or generate 214 an energy consumption report based on the usage record 120 before generating 202 a power policy 108 or at any time during execution of the method 200 illustrated in FIG. 2.

Figure 3:
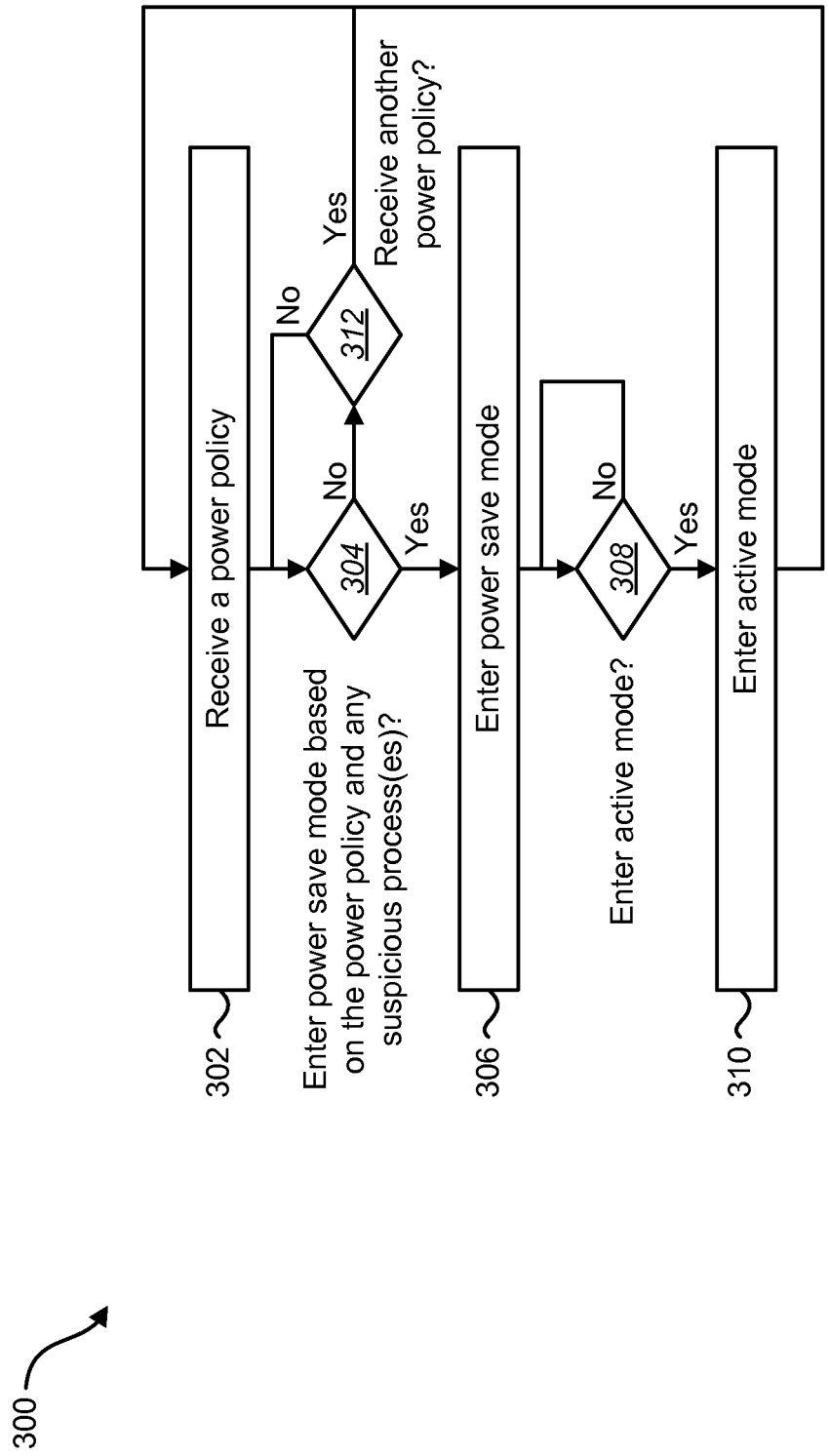
FIG. 3 is a flow diagram illustrating one configuration of a method for complying with a power policy.

FIG. 3 is a flow diagram illustrating one configuration of a method 300 for complying with a power policy 138. A managed node 128 may receive 302 a power policy 138. For example, a managed node 128 may receive 302 a power policy 138 via a network 126 using a communication interface 154. It should be noted that the power policy 138 may be received regardless of whether a user is logged into the managed node 128.

The managed node 128 may determine 304 whether to enter a power save mode based on the power policy and any suspicious processes detected. For example, the managed node 128 may determine whether or not it is time to enter power save mode according to a schedule 140 included in the power policy 138. The managed node 128 may further determine if there are one or more processes 134 (if any) that prevent entering power save mode. For instance, sensitive or suspicious processes 134 may prevent the managed node 128 from entering power save mode (e.g., hibernate, standby, sleep, etc.). In some configurations, this may be done in accordance with the process information 142 included in a power policy 138. For instance, the managed node 128 may query the operating system 130 for information about the idle process 132, such as a percentage of processor usage. Additionally or alternatively, the managed node 128 may query the operating system 130 for other information, such as names, owners, etc., of (sensitive or suspicious) processes 134. Such information may be compared to process information 142 in order to determine whether any of the processes 134 are sensitive and/or suspicious. This may be used to determine 304 whether to enter a power save mode.

If the managed node 128 determines 304 not to enter power save mode, the managed node 128 may determine 312 whether to receive another power policy. For example, the managed node 128 may use a deployment schedule (provided by the administrative system 102, for example) and/or timer to determine 312 when to anticipate receiving another power policy (if ever). Additionally or alternatively, the managed node 128 may receive a message indicating that another power policy is being or will be sent from the administrative system 102. In some configurations, the message may be the power policy 138 itself.

If the managed node 128 determines 312 not to receive another power policy, the managed node 128 return to determine 304 whether to enter power save mode based on the power policy 138 and any suspicious processes. If the managed node 128 determines 312 to receive another power policy 138, the managed node 128 may return to receiving 302 a power policy 138.

If the managed node 128 determines 304 to enter power save mode (e.g., there are no sensitive processes running and one or more suspicious processes (if any) have been terminated), the managed node 128 may enter 306 power save mode. For example, the managed node 128 may enter a hibernate mode, sleep mode, standby mode, etc., in which the managed node 128 consumes less energy (than while in active mode). For instance, the managed node 128 may reduce processor speed and/or reduce the types of instructions executable by the processor. Additionally or alternatively, the managed node 128 may disable or reduce the functionality of certain managed node components (e.g., turn off ports, drives, etc.). Additionally or alternatively, the managed node 128 may turn off monitors and other peripherals (or reduce their functionality). While in the power save mode, the managed node 128 may only be able to perform limited operations, such as process an input or request to enter active mode (e.g., "wake up").

The managed node 128 may determine 308 whether to enter an active mode. For example, the managed node 128 may determine 308 whether it has received a request or input to enter active mode (e.g., wake up) and/or whether it should enter active mode based on a power policy 138 schedule 140. For instance, if a time has arrived to enter active mode (e.g., wake up) according to the power policy 138 schedule 140, if an instruction to wake up is received over the network 126 and/or if an activating input is received (e.g., a user pushed an activation button), the managed node 128 may determine 308 to enter active mode. Otherwise, the managed node 128 may determine 308 not to enter an active mode. If the managed node 128 determines 308 not to enter active mode, it may continue to stay in power save mode and/or may return to determine 308 whether to enter active mode at a later time.

If the managed node 128 determines 308 to enter active mode, the managed node 128 may enter 310 active mode. For example, the managed node 128 may exit a hibernate mode, sleep mode, standby mode, etc. For instance, the managed node 128 may increase processor speed and/or increase the types of instructions executable by the processor. Additionally or alternatively, the managed node 128 may enable or increase the functionality of certain managed node components (e.g., turn on ports, drives, etc.). Additionally or alternatively, the managed node 128 may turn on monitors and other peripherals (or increase their functionality). While in the active mode, the managed node 128 may be able to perform regular operations. In some configurations and/or instances, the managed node 128 may return to receive 302 a power policy 138.

Figure 4:
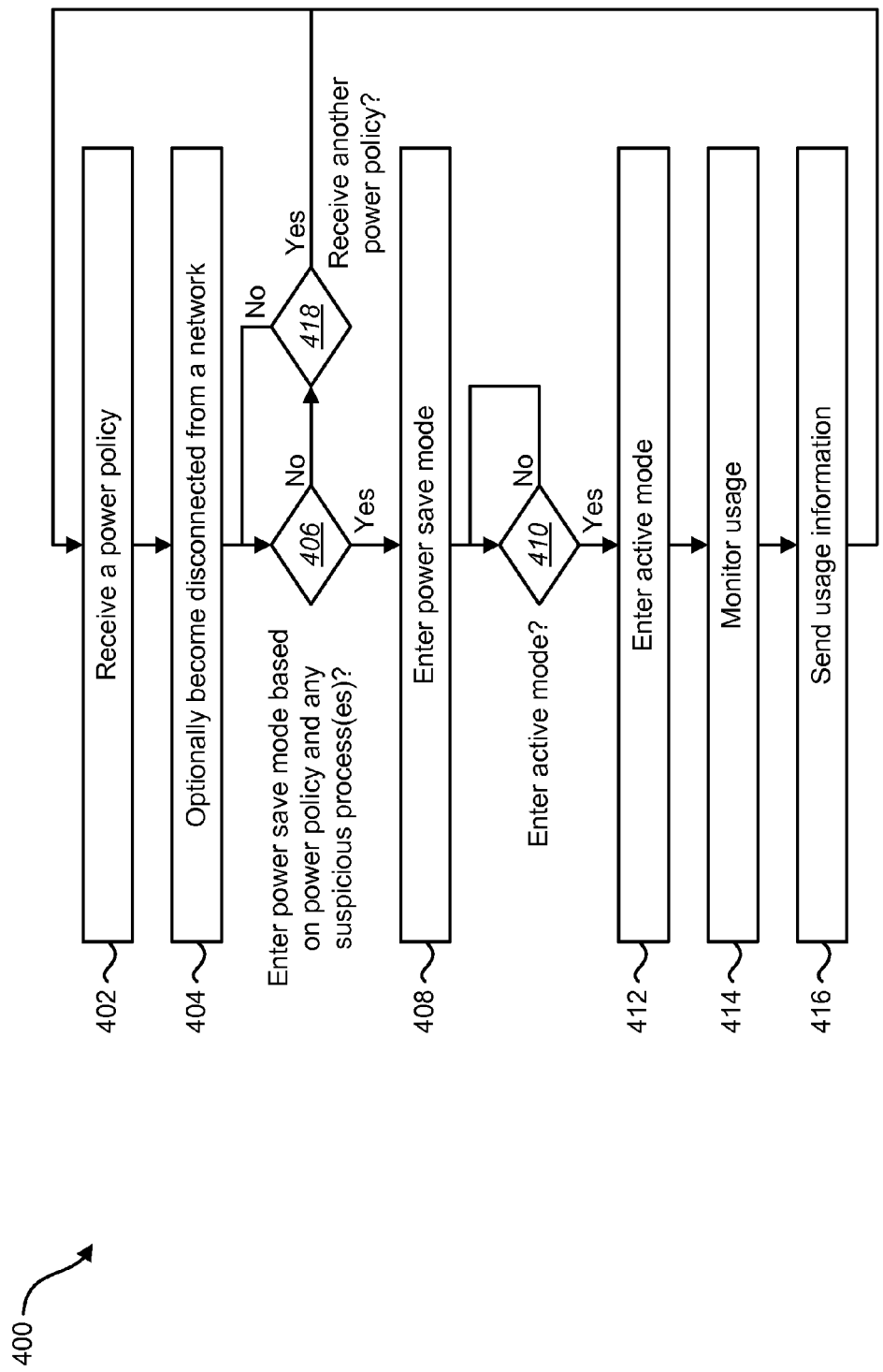
FIG. 4 is a flow diagram illustrating a more specific configuration of a method for complying with a power policy.

FIG. 4 is a flow diagram illustrating a more specific configuration of a method 400 for complying with a power policy 138. A managed node 128 may receive 402 a power policy 138. For example, a managed node 128 may receive 402 a power policy 138 via a network 126 using a communication interface 154. It should be noted that the power policy 138 may be received regardless of whether a user is logged into the managed node 128.

The managed node 128 may optionally become disconnected 404 from a network 126. For example, the managed node 128 may be intentionally or unintentionally disconnected 404 from the network 126. For instance, a wireless card for a laptop computer may lose a Wi-Fi connection, a tablet device may lose network 126 service from a base station, the network 126 may have technical problems that prevent a connection, a user may unplug an Ethernet cable from a computing device, the managed node 128 may deactivate its network card to save power, etc. In other words, the managed node 128 may disconnect itself from the network 126 or may lose its network 126 connection.

The managed node 128 may determine 406 whether to enter a power save mode based on the power policy and any suspicious processes detected. For example, the managed node 128 may determine whether or not it is time to enter power save mode according to a schedule 140 included in the power policy 138. The managed node 128 may further determine if there are one or more processes 134 (if any) that prevent entering power save mode. For instance, sensitive or suspicious processes 134 may prevent the managed node 128 from entering power save mode (e.g., hibernate, standby, sleep, etc.).

If the managed node 128 determines 406 not to enter power save mode, the managed node 128 may determine 418 whether to receive another power policy. For example, the managed node 128 may use a schedule and/or timer to determine 312 when to anticipate receiving another power policy (if ever). Additionally or alternatively, the managed node 128 may receive a message indicating that another power policy is being or will be sent from the administrative system 102. In some configurations, the message may be the power policy 138 itself.

If the managed node 128 determines 418 not to receive another power policy, the managed node 128 may return to determine 406 whether to enter power save mode based on the power policy 138 and any suspicious processes. If the managed node 128 determines 418 to receive another power policy 138, the managed node 128 may return to receiving 402 a power policy 138.

If the managed node 128 determines 406 to enter power save mode (e.g., there are no sensitive processes running and one or more suspicious processes (if any) have been terminated), the managed node 128 may enter 408 power save mode. For example, the managed node 128 may enter a hibernate mode, sleep mode, standby mode, etc., in which the managed node 128 consumes less energy (than while in active mode). For instance, the managed node 128 may reduce processor speed and/or reduce the types of instructions executable by the processor. Additionally or alternatively, the managed node 128 may disable or reduce the functionality of certain managed node components (e.g., turn off ports, drives, etc.). Additionally or alternatively, the managed node 128 may turn off monitors and other peripherals (or reduce their functionality). While in the power save mode, the managed node 128 may only be able to perform limited operations, such as process an input or request to enter active mode (e.g., "wake up").

The managed node 128 may determine 410 whether to enter an active mode. For example, the managed node 128 may determine 410 whether it has received a request or input to enter active mode (e.g., wake up) and/or whether it should enter active mode based on a power policy 138 schedule 140. For instance, if a time has arrived to enter active mode (e.g., wake up) according to the power policy 138 schedule 140, if an instruction to wake up is received over the network 126 and/or if an activating input is received (e.g., a user pushed an activation button), the managed node 128 may determine 410 to enter active mode. Otherwise, the managed node 128 may determine 410 not to enter an active mode. If the managed node 128 determines 410 not to enter active mode, it may continue to stay in power save mode and/or may return to determine 410 whether to enter active mode at a later time.

If the managed node 128 determines 410 to enter active mode, the managed node 128 may enter 412 active mode. For example, the managed node 128 may exit a hibernate mode, sleep mode, standby mode, etc. For instance, the managed node 128 may increase processor speed and/or increase the types of instructions executable by the processor. Additionally or alternatively, the managed node 128 may enable or increase the functionality of certain managed node components (e.g., turn on ports, drives, etc.). Additionally or alternatively, the managed node 128 may turn on monitors and other peripherals (or increase their functionality). While in the active mode, the managed node 128 may be able to perform regular operations.

The managed node 128 may monitor 414 usage. For example, the managed node 128 may monitor 414 its activity or usage. For example, the managed node 128 may generate and/or maintain usage records 146 of the managed node 128. Usage records 146 may include information that may be used to determine or estimate the energy or power consumption of the managed node 128. For example, the managed node 128 may record (in one or more usage records 146) amounts of time that the managed node 128 has been in an active mode and/or power saving mode, an amount of processor usage or loading, kinds of peripherals attached to the managed node 128 (e.g., monitors, mice, keyboards, speakers, USB drives, portable music players (e.g., MP3 players, iPods, etc.)), how many peripherals are attached, how long the peripherals have been active and/or inactive, the kind of interface used with a peripheral (e.g., USB, Bluetooth, etc.), integrated device activity (e.g., how long a Blu-Ray drive/DVD/CD drive was in use, etc.), a device type (e.g., whether the managed node 128 is a desktop computer, laptop computer, smart phone, etc.), etc. In order to record this information, the managed node 128 may query an operating system 130 for information regarding processor usage, operating mode (e.g., active mode or power save mode such as sleep, hibernate, standby, etc.) and transition times, kinds and numbers of attached peripherals and/or their states of usage, kinds of integrated devices (e.g., drives, etc.) and their state of usage, etc.

The managed node 128 may send 416 usage information (e.g., usage records 146). For example, the managed node 128 may send usage records 146 to the administrative system 102. The usage information may be sent 416 periodically, according to a schedule, on demand and/or based on a trigger (e.g., a user logs off). In some configurations and/or instances, the managed node 128 may return to receive 402 a power policy 138.

It should be noted that monitoring 414 usage and/or sending 416 usage information may occur at any time and do not need to follow step 412 as illustrated in FIG. 4. For example, a managed node 128 may monitor 414 usage and/or send 416 usage information before receiving 402 a power policy 138 or at any time during execution of the method 400 illustrated in FIG. 4.

Figure 5:
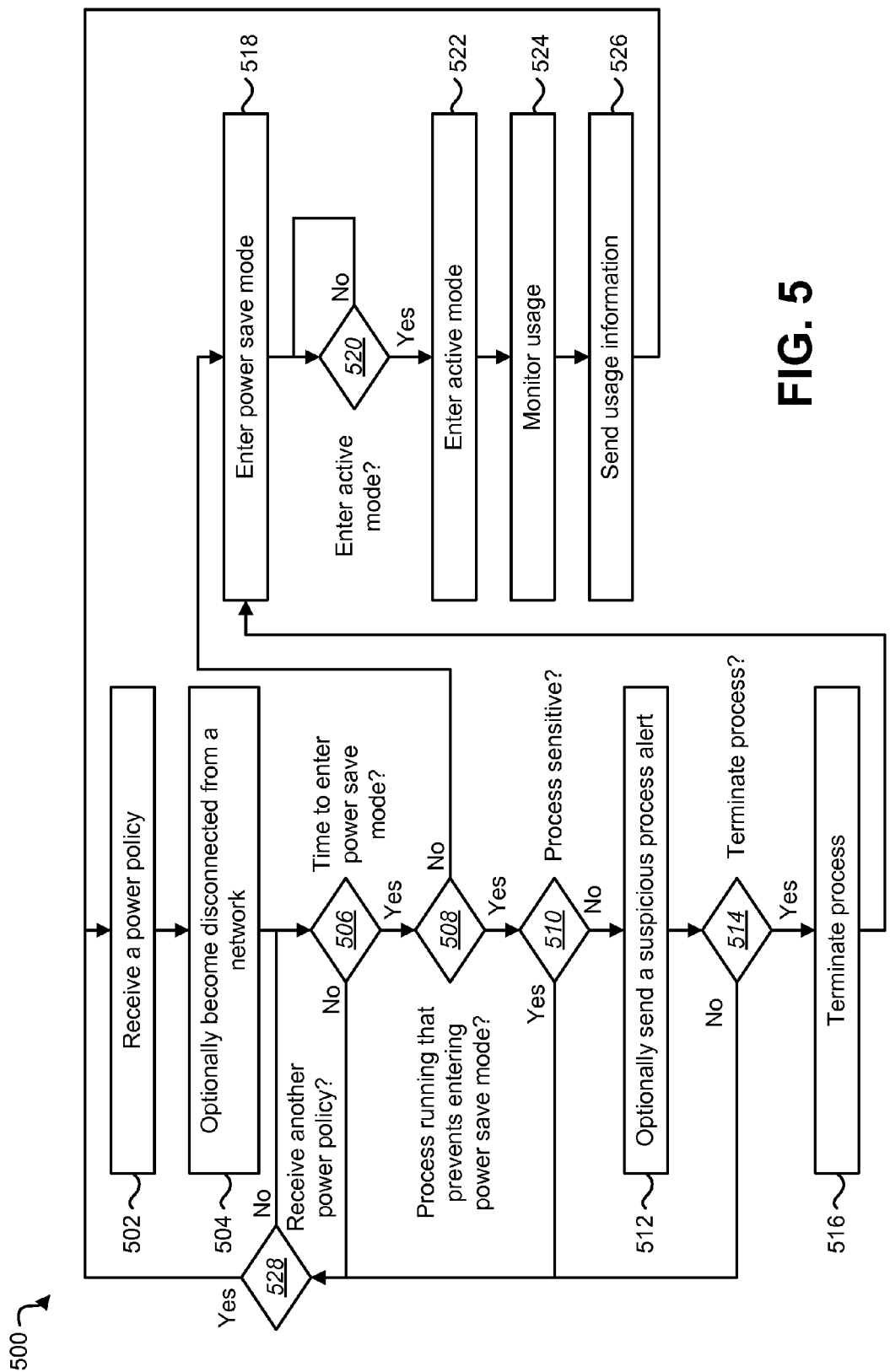
FIG. 5 is a flow diagram illustrating another more specific configuration of a method for complying with a power policy.

FIG. 5 is a flow diagram illustrating another more specific configuration of a method 500 for complying with a power policy 138. A managed node 128 may receive 502 a power policy 138. For example, a managed node 128 may receive 502 a power policy 138 via a network 126 using a communication interface 154. It should be noted that the power policy 138 may be received regardless of whether a user is logged into the managed node 128.

The managed node 128 may optionally become disconnected 504 from a network 126. For example, the managed node 128 may be intentionally or unintentionally disconnected 504 from the network 126. For instance, a wireless card for a laptop computer may lose a Wi-Fi connection, a tablet device may lose network 126 service from a base station, the network 126 may have technical problems that prevent a connection, a user may unplug an Ethernet cable from a computing device, the managed node 128 may deactivate its network card to save power, etc. In other words, the managed node 128 may disconnect itself from the network 126 or may lose its network 126 connection.

The managed node 128 may determine 506 whether it is time to enter a power save mode based on the power policy. For example, the managed node 128 may determine whether or not it is time to enter power save mode according to a schedule 140 included in the power policy 138. For instance, the managed node 128 may use a clock or time source to determine a current time. In one configuration, the current time may be compared with the power policy 138 schedule 140. If the current time falls within a scheduled power save mode period, the managed node 128 may determine 506 that it is time to enter power save mode. In another configuration, the starting time of a power save mode period may be used to trigger an event when the starting time is reached, thereby allowing the managed node 128 to determine 506 that it is time to enter power save mode. In yet another configuration, determining 506 to enter power save mode may be based on a period of inactivity or low activity on the managed node 128. For instance, if the managed node 128 has had greater than 95% of its processing resources dedicated to the idle process 132 for longer than 10 minutes, the managed node 128 may determine that it is time to enter power save mode. In yet another configuration, determining 506 whether to enter power save mode may be based on input (e.g., user) inactivity, such as not detecting peripheral input for a period of time.

If the managed node 128 determines 506 that it is not time to enter power save mode, the managed node 128 may determine 528 whether to receive another power policy. For example, the managed node 128 may use a schedule and/or timer to determine 528 when to anticipate receiving another power policy (if ever). Additionally or alternatively, the managed node 128 may receive a message indicating that another power policy is being or will be sent from the administrative system 102. In some configurations, the message may be the power policy 138 itself.

If the managed node 128 determines 528 not to receive another power policy, the managed node 128 return to determine 506 whether it is time to enter power save mode. If the managed node 128 determines 528 to receive another power policy 138, the managed node 128 may return to receiving 502 a power policy 138.

If the managed node 128 determines 506 that it is time to enter power save mode, the managed node 128 may determine 508 if there are any processes 134 (e.g., none, one or more processes) running that prevent entering power save mode. For instance, sensitive or suspicious processes 134 may prevent the managed node 128 from entering power save mode (e.g., hibernate, standby, sleep, etc.). In one configuration, the managed node 128 may determine 508 if there are any processes 134 running that prevent entering power save mode based on a system idle measurement. For example, a managed node 128 may query its operating system 130 for a percentage of processing that is being consumed in an idle process 132. Some computing devices (e.g., managed nodes 128) may only enter a power save mode (e.g., sleep, hibernate, standby, etc.) if the idle process 132 is consuming more than a threshold amount of processing resources. Thus, the managed node 128 may determine 508 whether any processes 134 are preventing entering power save mode if the idle process 132 is consuming less than the threshold amount of processing resources (needed to enter power save mode). If the managed node 128 determines 508 that there are no processes running that prevent entering power save mode, then the managed node 128 may enter 518 power save mode.

If the managed node 128 determines 508 that there are one or more processes 134 running that prevent the managed node 128 from entering power save mode, the managed node 128 may determine 510 whether the one or more processes 134 are sensitive processes. For example, the managed node 128 may determine whether any of the one or more processes 134 are on a list of sensitive processes that should not be disrupted. In one configuration, the list of sensitive processes may be included in the power policy 138 (e.g., in the process information 142). Additionally or alternatively, the list may include sensitive process information that is stored on the managed node 128, which may be accumulated through past power policies and/or specified by a user. In another example, the managed node 128 may determine whether any of the one or more processes 134 satisfy a rule designating sensitive processes (that have one or more sensitive process characteristics (e.g., names, extensions, behaviors, owner names, etc.), for example). In yet another example, the managed node 128 may send information (e.g., process information) to another device (e.g., the administrative system 102) and may receive a message from the other device indicating whether a process is sensitive or not. A combination of these approaches to determine 510 whether a process is sensitive or not may additionally or alternatively be used. If the managed node 128 determines 510 that at least one of the processes 134 is sensitive, the managed node 128 may determine 528 whether to receive another power policy as described above. In one configuration, any of the processes that are not deemed sensitive and that prevent the managed node 128 from entering power save mode may be deemed or identified as suspicious processes. For instance, if an unknown (e.g., not sensitive) process is consuming enough processing resources to keep the managed node 128 awake, it may be deemed a suspicious process.

If the managed node 128 determines 510 that none of the one or more processes 134 (that prevent the managed node 128 from entering power save mode) are sensitive, then the managed node 128 may optionally send 512 a suspicious process alert 116. For example, the managed node 128 may send a suspicious process alert 116 to the administrative system 102. In one configuration, the suspicious process alert 116 may identify the one or more suspicious processes and/or may include information about the one or more suspicious processes. In the case where the managed node 128 has become disconnected 504 from the network 126, the managed node 128 may not send 512 the suspicious process alert.

The managed node 128 may determine 514 whether to terminate the one or more suspicious processes. In one configuration, the managed node 128 may receive a command from another device (e.g., the administrative system 102) to terminate or not terminate one or more of the suspicious processes. Additionally or alternatively, the managed node 128 may apply one or more rules or algorithms to determine 514 whether to terminate the one or more suspicious processes.

For example, the managed node 128 may use a list of processes, which may specify whether each process should and/or should not be terminated. If the one or more suspicious processes appear on the list, the managed node 128 may determine 514 to terminate or not terminate the one or more suspicious processes based on the list. In some configurations, such a list may be included in the power policy 138 (e.g., in the process information 112). Additionally or alternatively, the list may include suspicious process information that is stored on the managed node 128, which may be accumulated through past power policies 138 and/or specified by a user.

In another example, the managed node 128 may apply a rule to determine 514 whether or not to terminate one or more suspicious processes. For example, if a suspicious process is unknown (e.g., not specified by a list), then the managed node 128 may not terminate the suspicious process by default. In another example, if the suspicious process is unknown, the managed node 128 may terminate the process by default.

If the managed node 128 determines 514 not to terminate at least one suspicious process, then the managed node 128 may determine 528 whether to receive another power policy 138 as described above. However, if the managed node 128 determines 514 to terminate the one or more suspicious processes, the managed node 128 may terminate 516 the one or more suspicious processes. For example, the agent 136 may send an instruction to the operating system 130, commanding it 130 to terminate the one or more suspicious processes.

The managed node 128 may enter 518 power save mode. For example, the managed node 128 may enter a hibernate mode, sleep mode, standby mode, etc., in which the managed node 128 consumes less energy (than while in active mode). For instance, the managed node 128 may reduce processor speed and/or reduce the types of instructions executable by the processor. Additionally or alternatively, the managed node 128 may disable or reduce the functionality of certain managed node components (e.g., turn off ports, drives, etc.). Additionally or alternatively, the managed node 128 may turn off monitors and other peripherals (or reduce their functionality). While in the power save mode, the managed node 128 may only be able to perform limited operations, such as process an input or request to enter active mode (e.g., "wake up").

The managed node 128 may determine 520 whether to enter an active mode. For example, the managed node 128 may determine 520 whether it has received a request or input to enter active mode (e.g., wake up) and/or whether it should enter active mode based on a power policy 138 schedule 140. For instance, if a time has arrived to enter active mode (e.g., wake up) according to the power policy 138 schedule 140, if an instruction to wake up is received over the network 126 and/or if an activating input is received (e.g., a user pushed an activation button), the managed node 128 may determine 520 to enter active mode. Otherwise, the managed node 128 may determine 520 not to enter an active mode. If the managed node 128 determines 520 not to enter active mode, it may continue to stay in power save mode and/or may return to determine 520 whether to enter active mode at a later time.

If the managed node 128 determines 520 to enter active mode, the managed node 128 may enter 522 active mode. For example, the managed node 128 may exit a hibernate mode, sleep mode, standby mode, etc. For instance, the managed node 128 may increase processor speed and/or increase the types of instructions executable by the processor. Additionally or alternatively, the managed node 128 may enable or increase the functionality of certain managed node components (e.g., turn on ports, drives, etc.). Additionally or alternatively, the managed node 128 may turn on monitors and other peripherals (or increase their functionality). While in the active mode, the managed node 128 may be able to perform regular operations.

The managed node 128 may monitor 524 usage. For example, the managed node 128 may monitor 524 its activity or usage. For example, the managed node 128 may generate and/or maintain usage records 146 of the managed node 128. Usage records 146 may include information that may be used to determine or estimate the energy or power consumption of the managed node 128. For example, the managed node 128 may record (in one or more usage records 146) amounts of time that the managed node 128 has been in an active mode and/or power saving mode, an amount of processor usage or loading, kinds of peripherals attached to the managed node 128 (e.g., monitors, mice, keyboards, speakers, USB drives, portable music players (e.g., MP3 players, iPods, etc.)), how many peripherals are attached, how long the peripherals have been active and/or inactive, the kind of interface used with a peripheral (e.g., USB, Bluetooth, etc.), integrated device activity (e.g., how long a Blu-Ray drive/DVD/CD drive was in use, etc.), a device type (e.g., whether the managed node 128 is a desktop computer, laptop computer, smart phone, etc.), etc. In order to record this information, the managed node 128 (e.g., agent 136) may query an operating system 130 for information regarding processor usage, operating mode (e.g., active mode or power save mode such as sleep, hibernate, standby, etc.) and transition times, kinds and numbers of attached peripherals and/or their states of usage, kinds of integrated devices (e.g., drives, etc.) and their state of usage, etc.

The managed node 128 may send 526 usage information (e.g., usage records 146). For example, the managed node 128 may send usage records 146 to the administrative system 102. The usage information may be sent 526 periodically, according to a schedule, on demand and/or based on a trigger (e.g., a user logs off).

It should be noted that monitoring usage 524 and/or sending 526 usage information may occur at any time and do not need to follow step 522 as illustrated in FIG. 5. For example, a managed node 128 may monitor 524 usage and/or send 526 usage information before receiving 502 a power policy 138 or at any time during execution of the method 500 illustrated in FIG. 5.

Figure 6:
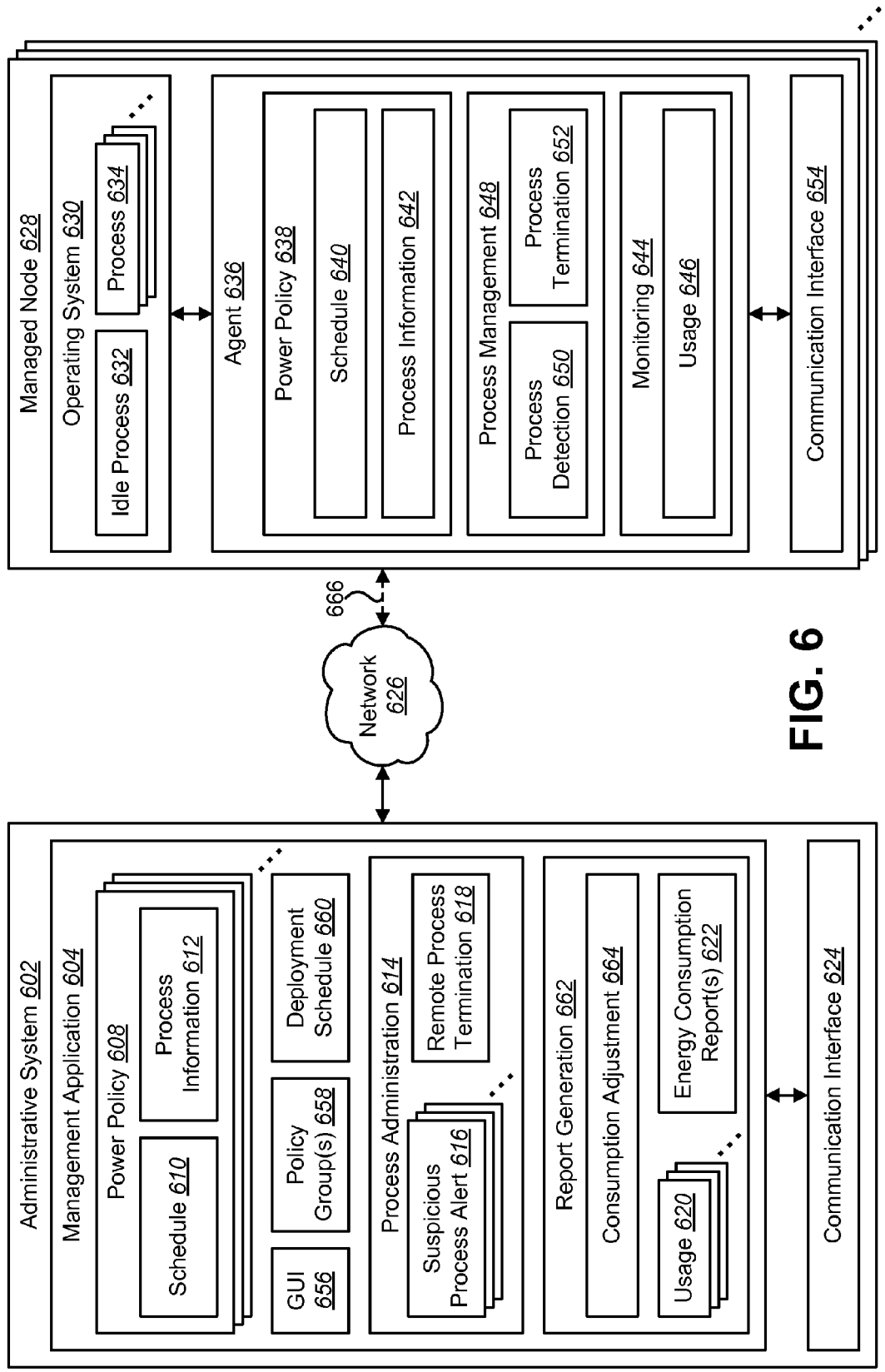
FIG. 6 is a block diagram illustrating one configuration of an administrative system and one or more managed nodes in which systems and methods for enforcing and complying with a computing device power policy may be implemented.

FIG. 6 is a block diagram illustrating one configuration of an administrative system 602 and one or more managed nodes 628 in which systems and methods for enforcing and complying with a computing device power policy may be implemented. The administrative system 602 may be a computing device configured for enforcing a power policy. Examples of the administrative system 602 include desktop computers, laptop computers, supercomputers, servers, cellular phones, smartphones, tablet devices, e-readers, gaming devices, etc. The one or more managed nodes 628 may be computing devices configured for complying with a power policy. Examples of the one or more managed nodes 628 include desktop computers, laptop computers, supercomputers, servers, cellular phones, smartphones, tablet devices, e-readers, gaming devices, etc.

The administrative system 602 may include a management application 604 and/or a communication interface 624. The management application 604 may comprise software, a program, computer instructions, code, etc., that is executed or runs on the administrative system 602. For example, instructions for the management application 604 may be stored in memory and executed by a processor on the administrative system 602 in order to execute or run the management application 604.

The communication interface 624 may comprise hardware and/or software used to communicate with other devices. For instance, the communication interface 624 may communicate with one or more managed nodes 628 on a network 626 using a wired and/or wireless link. Examples of the communication interface 624 include network cards, Ethernet adapters, Universal Serial Bus (USB) adapters, Bluetooth transceivers, Institute of Electrical and Electronics Engineers (IEEE)

802.11 (e.g., Wi-Fi) transceivers, 3rd Generation Partnership Project (3GPP)-compliant transceivers, Global System for Mobile Communications (GSM)-compliant transceivers, fiber optic modems, etc.

The management application 604 may be used to manage the energy or power consumption of one or more managed nodes 628 on the network 626. The management application 604 may include one or more power policies 608, a graphical user interface (GUI) 656, one or more policy groups 658, a deployment schedule 660, a process administration module 614 and/or a report generation module 662.

A power policy 608 may comprise data and/or instructions that may be used to control and/or monitor the power or energy consumption of one or more managed nodes 628. The power policy 608 may include a schedule 610. The schedule 610 may indicate times and/or periods when a managed node 628 should enter a power save mode (e.g., a sleep mode) and/or when a managed node 628 should enter an active mode (e.g., awake mode). For example, the power policy 608 schedule 610 may indicate that a managed node 628 should enter a power save mode after 6:00 p.m. each business day and should enter an active mode at 6:00 a.m. each business day. In one configuration, this schedule 610 may be followed by a managed node 628 contingent upon one or more sensitive processes and/or possibly contingent upon one or more suspicious processes.

The power policy 608 may optionally include process information 612. Process information 612 may specify one or more processes as sensitive processes. The process information 612 may optionally specify one or more processes as suspicious processes. For example, specifying suspicious processes may allow the administrative system 602 to affirmatively determine whether to terminate a known or specific suspicious process (on a case-by-case basis). The administrative system 602 may send (e.g., deploy) one or more power policies 608 to one or more managed nodes 628 on the network. In some configurations, a power policy 608 may include other information, such as default rules for suspicious processes (e.g., whether to terminate or not terminate suspicious processes by default or in the event that a managed node 628 loses its connection 666 and cannot communicate with the administrative system 602 when a suspicious process is detected).

In some configurations, one or more power policies 608 may be deployed (e.g., sent) according to a deployment schedule 660. For example, different power policies 608 may be deployed at different times during a day, week and/or year. For instance, a deployment schedule 660 may deploy power policy A 608 during the business day, power policy B 608 after business hours and power policy C 608 on weekends.

In some configurations, one or more power policies 608 may be deployed according to one or more policy groups 658. For example, a policy group 658 may specify one or more managed nodes 628. Thus, different power policies 608 may be deployed to different groups of managed nodes 628. For instance, power policy A 608 may be deployed to group A that includes 10 managed nodes 628, while power policy B 608 may be deployed to group B that includes 100 managed nodes 628. In some configurations, policy groups 658 may overlap or may be exclusive. In the case where overlapping policy groups 658 exist, particular power policies 608 may take priority over other power policies 608.

The graphical user interface (GUI) 656 may provide an interface that allows user interaction with the administrative system 602. For example, the GUI 656 may be presented on a display and may be interacted with using an interfacing device (e.g., a mouse, touchpad, joystick, controller, keyboard, camera and/or microphone, etc.). The GUI 656 may provide one or more controls. In one configuration, these controls may allow a user to interact with the management application 604. For example, a user may configure one or more power policies 608, establish and/or adjust a schedule 610, change process information 612 (e.g., add/remove sensitive processes, add/remove suspicious processes, add/edit/remove rules, etc.), configure one or more policy groups 658, configure the deployment schedule 660, adjust factors using the consumption adjustment module 664, retrieve/output one or more energy consumption reports 622, etc.

Each managed node 628 may include an operating system 630, an agent 636 and/or a communication interface 654. The communication interface 654 may comprise hardware and/or software used to communicate with other devices. For instance, the communication interface 654 may communicate with administrative system 602 on the network 626 using a wired and/or wireless link or connection 666. Examples of the communication interface 654 include network cards, Ethernet adapters, Universal Serial Bus (USB) adapters, Bluetooth transceivers, Institute of Electrical and Electronics Engineers (IEEE) 802.11 (e.g., Wi-Fi) transceivers, 3rd Generation Partnership Project (3GPP)-compliant transceivers, Global System for Mobile Communications (GSM)-compliant transceivers, fiber optic modems, etc.

In some configurations and/or instances, one or more managed nodes 628 may become disconnected from the network 626. For example, a managed node 628 may be intentionally or unintentionally disconnected from the network 626. For instance, a wireless card for a laptop computer may lose a Wi-Fi connection, a tablet device may lose network 626 service from a base station, the network 626 may have technical problems that prevent a connection, a user may unplug an Ethernet cable from a computing device, the managed node 628 may deactivate its network card to save power, etc. In other words, the managed node 628 may disconnect itself from the network 626 or may lose its network 626 connection 666, which may prevent communication between the administrative system 602 and the managed node 628.

The operating system 630 may comprise software that is used to operate the managed node 628. Examples of operating systems 630 include Microsoft Windows, OS X, Linux, Unix, Android, iOS, etc. The operating system 630 may monitor an idle process 632 and one or more (other) processes 634. And idle process 632 may be used when processing cycles on the managed node 628 are not being requested from one or more other processes 634. Thus, the idle process 632 may provide a measure of processing activity on the managed node 628. The one or more processes 634 may represent one or more programs, applications or processes that are currently being processed (e.g., running) on the managed node 628.

The agent 636 may be an application or program that is used to perform operations on the managed node 628 at the direction of the administrative system 602. The agent 636 may receive one or more power policies 638 from the administrative system 602. A power policy 638 may comprise data and/or instructions that may be used to control and/or monitor the power or energy consumption of the managed node 628. The power policy 638 may include a schedule 640. The schedule 640 may indicate times and/or periods when a managed node 628 should enter a power save mode (e.g., a sleep mode) and/or when a managed node 628 should enter an active mode (e.g., awake mode). For example, the power policy 638 schedule 640 may indicate that the managed node 628 should enter a power save mode after 6:00 p.m. each business day and should enter an active mode at 6:00 a.m. each business day. In one configuration, this schedule 640 may be followed by a managed node 628 contingent upon one or more sensitive processes and/or possibly contingent upon one or more suspicious processes. For example, a managed node 628 may enter power save mode in accordance with a power policy 638 unless prevented by a sensitive process, a suspicious process or a user. If a suspicious process is terminated that was preventing the managed node 628 from entering power save mode, the managed node 628 may then enter power save mode. The managed node 628 may enter active mode according to the power policy 638.

The power policy 638 may optionally include process information 642. Process information 642 may specify one or more processes as sensitive processes. The process information 642 may optionally specify one or more processes as suspicious processes. It should be noted that in the case that the managed node 628 uses multiple power policies 638, that one power policy 638 may take priority over another power policy 638 and/or multiple power policies 638 may be used concurrently (where they are not inconsistent). In some configurations, the process information 642 may provide rules for handling suspicious processes. For example, the process information 642 may specify whether to terminate a suspicious process when identifying known and/or unknown suspicious processes.

The process management module 648 may be used to detect and/or terminate one or more processes 634. For example, the process management module 648 may include a process detection module 650 and/or a process termination module 652. The process detection module 650 may detect one or more processes 634 that are running on the managed node 628.

The process management module 648 may classify the one or more processes 634 (and the idle process 632) as sensitive or suspicious. Processes that are not sensitive or suspicious may be disrupted, suspended or terminated and/or may not affect a managed node's 628 ability to enter power save mode. A sensitive process may be a high-priority, critical or user-specified process that should not be disrupted or suspended. Examples of sensitive processes may include running applications that are currently in use, firmware updates that should not be disrupted, some compilation processes and/or user-specified sensitive processes. Some sensitive processes may have particular owners (e.g., entities that launched the processes) and/or particular characteristics (e.g., certain file extensions, file names, etc.). Suspicious processes may be processes that keep a managed node 628 in an active state (e.g., awake) and that are not known or not designated as sensitive processes. For example, if a process 634 is consuming an amount of processing resources such that the idle process 632 resource consumption is not above a threshold that allows entering power save mode and the process 634 is not identified as a sensitive process, that process 634 may be deemed or designated as a suspicious process. A suspicious process may waste energy if it keeps the managed node 628 in an active state when it is not performing useful tasks. However, a suspicious process may be performing a useful task that should not be disrupted.

The process management module 648 may classify the one or more processes 634 based on the process information 642 in the power policy 638. Additionally or alternatively, the managed node 628 may maintain a list of sensitive and/or suspicious processes. For example, the process detection module 650 may obtain a list of running processes 632, 634 from the operating system 630. The process management block/module 648 may compare the list of running processes 632, 634 to the process information 642 and/or a stored list of sensitive and/or suspicious processes. One or more processes 634 detected that are not designated as sensitive and that keep the managed node 628 in an active state may be designated as suspicious processes. Additionally or alternatively, if a process 634 matches suspicious processes indicated by the process information 642 or a stored list of suspicious processes, then the process 634 may be designated as a suspicious process.

In some configurations, the managed node 628 may send one or more suspicious process alerts 616 to the administrative system 602. The process administration module 614 may receive the one or more suspicious process alerts 616. A suspicious process alert 616 may indicate one or more processes that have been designated suspicious by a managed node 628. The process administration module 614 may determine whether or not the one or more suspicious processes indicated by the alert(s) 616 should be terminated.

Depending on the configuration of the systems and methods herein, one or more procedures may be followed in determining whether to terminate a suspicious process. For example, the administrative system 602 may present a suspicious process alert 616 to an administrator (e.g., user of the administrative system 602) using the graphical user interface (GUI) 656. In this case, the administrative system 602 may receive an input via the GUI 656 (from a user, for example) that indicates whether or not the suspicious process should be terminated. In another example, the administrative system 602 may include a list of suspicious processes, where each suspicious process has a directive. A directive may indicate whether the corresponding suspicious process should be terminated or not. Additionally or alternatively, the administrative system 602 may maintain one or more rules for suspicious processes. These rules may be default rules (e.g., terminate or do not terminate any unknown suspicious processes) or may be more specific (e.g., terminate or do not terminate any suspicious process with certain characteristics such as a certain extension, activity level, source, name, owner, etc.). The foregoing examples may be used independently and/or in combination, depending on the systems and methods disclosed herein. Furthermore, different procedures may be followed for different managed nodes 628 and/or groups of managed nodes 628.

If the process administration module 614 determines that a suspicious process should be terminated, it 614 may use a remote process termination module 618 to send a command to the managed node 628 (that is hosting the suspicious process) to terminate the suspicious process. The managed node 628 may then terminate the suspicious process using the process termination module 652. For example, the process termination module 652 may send a command to the operating system 630 to terminate the suspicious process. If the process administration module 614 determines that a suspicious process should not be terminated, the administrative system 602 may do nothing or may send a command or an indicator to the corresponding managed node 628 that the suspicious process should not be terminated. If the managed node 628 receives nothing in response to the suspicious process alert or receives a command or indicator that the suspicious process should not be terminated, then the managed node 628 may not terminate the suspicious process.

Each managed node 628 may include a monitoring module 644. The monitoring module 644 may be used to monitor the activity or usage of a managed node 628. For example, the monitoring module 644 may generate and/or maintain usage records 646 of the managed node 628. Usage records 646 may include information that may be used to determine or estimate the energy or power consumption of the managed node 628. Some examples of information that the usage records 646 may include are amounts of time that the managed node 628 has been in an active mode and/or power saving mode, an amount of processor usage or loading, kinds of peripherals attached to the managed node 628 (e.g., monitors, mice, keyboards, speakers, USB drives, portable music players (e.g., MP3 players, iPods, etc.)), how many peripherals are attached, how long the peripherals have been active and/or inactive, the kind of interface used with a peripheral (e.g., USB, Bluetooth, etc.), integrated device activity (e.g., how long a Blu-Ray drive/DVD/CD drive was in use, etc.), a device type (e.g., whether the managed node 628 is a desktop computer, laptop computer, smart phone, etc.), etc. Each managed node 628 may send usage records 646 to the administrative system 602. The usage records 646 may be sent periodically, according to a schedule, on demand and/or based on a trigger (e.g., a user logs off).

The administrative system 602 may receive one or more usage records 620 from the one or more managed nodes 628. The administrative system 602 may include a report generation module 662 that may use the usage record(s) 620 to generate one or more energy consumption reports 622. For example, the administrative system 602 may use an algorithm to determine or estimate the amount of energy or power consumed by one or more managed nodes 628. In one configuration, the administrative system 602 may use an active mode power consumption factor and a power saving mode power consumption factor in conjunction with active mode times and power saving mode times indicated by usage records 620 to determine or estimate the energy consumption of each managed node 628.

In some configurations, these power consumption factors may be adjusted by an administrator to better reflect the actual power consumption of a managed node 628. For example, the report generation module 662 may include a consumption adjustment module 664. The consumption adjustment module 664 may allow a user to adjust or change power consumption factors. For instance, if an administrator has independently measured the energy consumption of a managed node 628 and an energy consumption report 622 for the same period indicates a discrepancy, the administrator may use the consumption adjustment module 664 to adjust consumption factors such that the energy consumption report 622 more accurately reflects actual energy consumption. In some configurations, the consumption adjustment module 664 may be controlled by an administrator through the use of the GUI 656.

Figure 7:
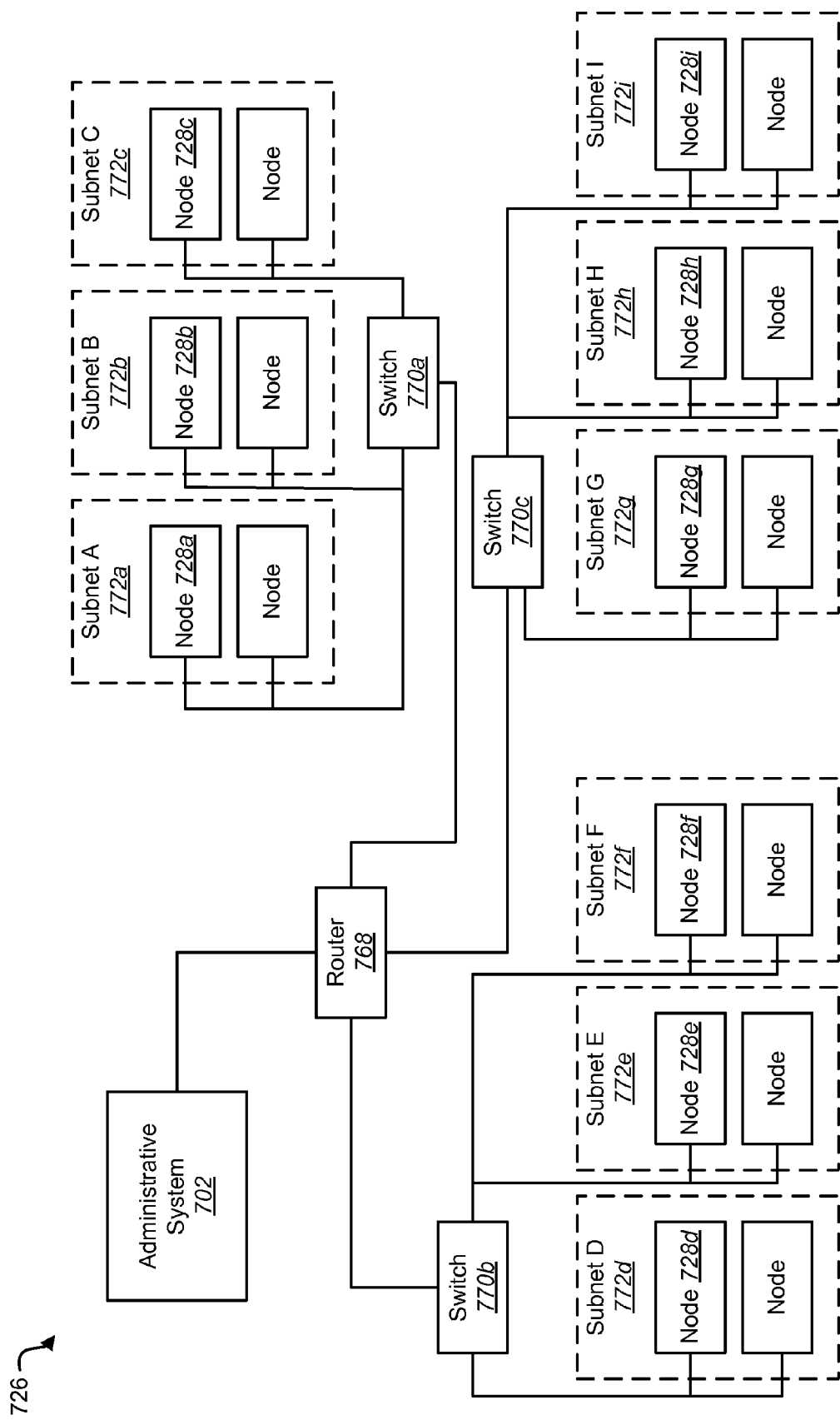
FIG. 7 is a block diagram that illustrates one configuration of a network where systems and methods for enforcing and complying with a computing device power policy may be implemented.

FIG. 7 is a block diagram that illustrates one configuration of a network 726 where systems and methods for enforcing and complying with a computing device power policy may be implemented. An administrative system 702 is connected to a router 768. The router 768 is connected to switches 770a, 770b, 770c. The switch 770a is connected to several nodes 728a, 728b, 728c, etc., via their respective subnets 772a, 772b, 772c. The switch 770b is connected to several nodes 728d, 728e, 728f, etc., via their respective subnets 772d, 772e, 772f. The switch 770c is connected to several nodes 728g, 728h, 728i, etc., via their respective subnets 772g, 772h, 772i. Although FIG. 7 only shows one router 768, and a limited number of switches 770, subnets 772, and nodes 728, many and varied numbers of routers 768, switches 770, subnets 772 and nodes 728 may be included in networks and/or systems where methods and systems for enforcing and complying with a computing device power policy may be implemented. It should be noted that the administrative system 702 illustrated in FIG. 7 may be configured similarly to the administrative systems 102, 602 described above. It should also be noted that the nodes 728 illustrated in FIG. 7 may be configured similarly to the managed nodes 128, 628 described above.

Figure 8:
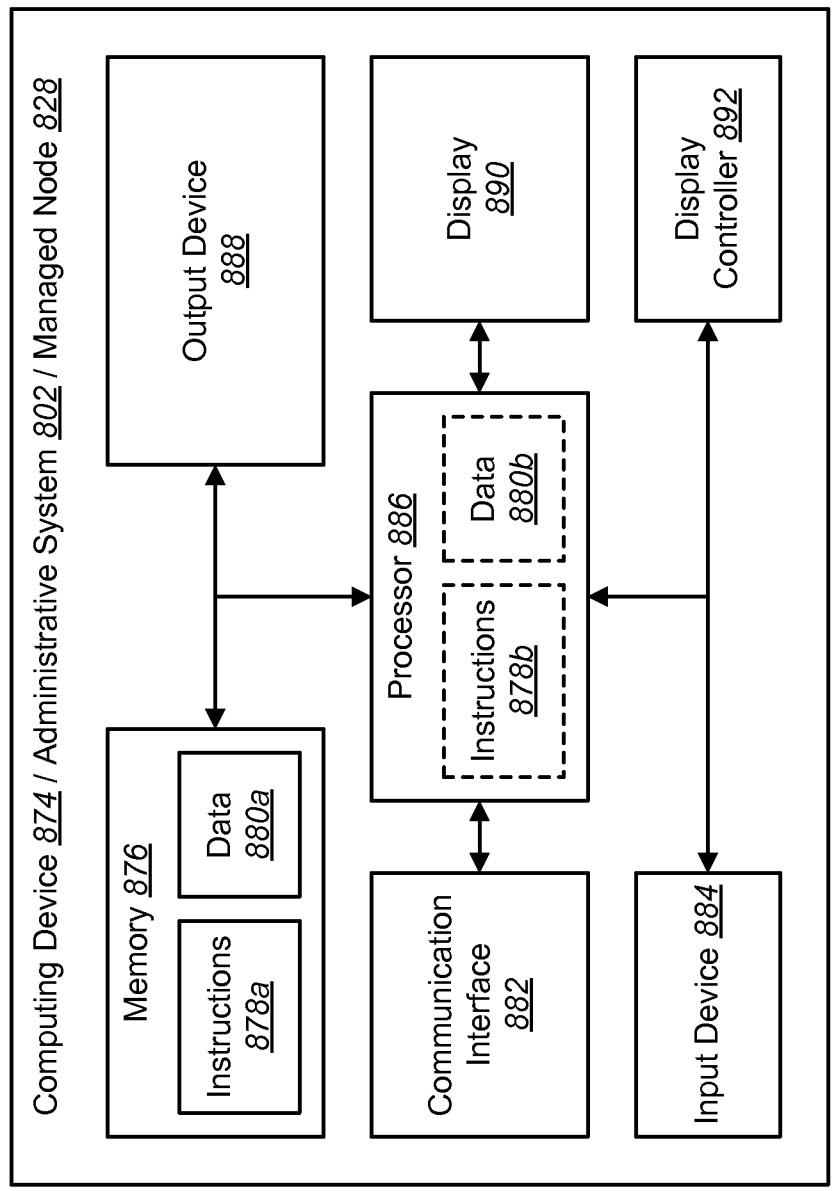
FIG. 8 illustrates various components that may be utilized in a computing device, administrative system and/or managed node.

FIG. 8 illustrates various components that may be utilized in a computing device 874, administrative system 802 and/or managed node 828. The illustrated components may be located within the same physical structure or in separate housings or structures. The computing device 874 illustrated in FIG. 8 may be configured similarly to one or more of the administrative systems 102, 602, 702 and/or managed nodes 128, 628, 728 described above. The administrative system 802 illustrated in FIG. 8 may be configured similarly to one or more of the administrative systems 102, 602, 702 described above. The managed node 828 illustrated in FIG. 8 may be configured similarly to one or more of the managed nodes 128, 628, 728 described above.

The computing device 874/administrative system 802/ managed node 828 may include a processor 886 and memory 876. The memory 876 may be any device capable of storing electronic information (e.g., Programmable Read-Only Memory (PROM), Erasable Programmable Read-Only Memory (EPROM), Electronically Erasable Programmable Read-Only Memory (EEPROM), Dynamic Random Access Memory (DRAM), Double Data Rate Synchronous Dynamic Random Access Memory (DDR SDRAM), flash memory, including combinations thereof, etc.). The memory 876 may include instructions 878a and data 880a. The processor 886 controls the operation of the computing device 874/administrative system 802/managed node 828 and may be, for example, a microprocessor, a microcontroller, a digital signal processor (DSP) or other device known in the art. The processor 886 may be in electronic communication with the memory 876. The processor 886 typically performs logical and arithmetic operations based on program instructions 878b and/or data 880b it loads from the memory 876.

The computing device 874/administrative system 802/ managed node 828 typically may include one or more communication interfaces 882 for communicating with other electronic devices. The communication interfaces 882 may be based on wired communication technology, wireless communication technology, or both. Examples of different types of communication interfaces 882 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The computing device 874/administrative system 802/ managed node 828 typically may include one or more input devices 884 and one or more output devices 888. Examples of different kinds of input devices 884 include a keyboard, mouse, microphone, remote control device, button, joystick, trackball, touchpad, lightpen, etc. Examples of different kinds of output devices 888 include a speaker, printer, etc. One specific type of output device which may be typically included in a computer system is a display device 890. Display devices 890 used with configurations disclosed herein may utilize any suitable image projection technology, such as a cathode ray tube (CRT), liquid crystal display (LCD), light-emitting diode (LED), gas plasma, electroluminescence, or the like. A display controller 892 may also be provided for converting data 880a stored in the memory 876 into text, graphics and/or moving images (as appropriate) shown on the display device 890.

Of course, FIG. 8 illustrates only one possible configuration of a computing device 874/administrative system 802/ managed node 828. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable or processor-readable statements.

The term "computer-readable medium" refers to any available medium that can be accessed by a computer or processor. By way of example and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured for enforcing a computing device power policy, comprising:
    a processor;
    memory in electronic communication with the processor;
    instructions stored in the memory, the instructions being executable to:
        generate a power policy;
        send the power policy to a managed node over a network;
        receive a suspicious process alert from the managed node across the network, wherein the suspicious process alert indicates a process that has been designated a suspicious process;
        determine whether to terminate the suspicious process; and
        send a process termination command if it is determined to terminate the suspicious process.

2. The computing device of claim 1, wherein the instructions are further executable to:
    receive a usage record; and
    generate an energy consumption report based on the usage record.

3. The computing device of claim 2, wherein the instructions are further executable to adjust the energy consumption report based on a consumption factor adjustment.

4. The computing device of claim 1, wherein the instructions are further executable to send the power policy according to one selected from a group consisting of a deployment schedule and a policy group.

5. The computing device of claim 1, wherein determining whether to terminate the suspicious process is based on a received input.

6. A computing device configured for complying with a computing device power policy, comprising:
    a processor;
    memory in electronic communication with the processor;
    instructions stored in the memory, the instructions being executable to:
        receive a power policy via a network;
        determine whether to enter a power save mode based on the power policy and any suspicious process, and if it is determined to enter the power save mode, then:
            enter the power save mode;
            determine whether to enter an active mode; and
            enter the active mode if it is determined to enter the active mode.

7. The computing device of claim 6, wherein the computing device is disconnected from the network after receiving the power policy.

8. The computing device of claim 6, wherein the instructions are further executable to:
monitor usage; and
send usage information.

9. The computing device of claim 6, wherein determining whether to enter the power save mode based on the power policy and any suspicious process comprises:
determining whether it is time to enter the power save mode;
determining whether a process is running that prevents entering the power save mode if it is time to enter the power save mode;
determining whether the process is a sensitive process if the process is running that prevents entering power save mode;
determining whether to terminate the process if the process is not the sensitive process; and
terminating the process if it is determined to terminate the process.

10. The computing device of claim 9, wherein if it is determined that the process is not the sensitive process, then the instructions are further executable to send a suspicious process alert.

11. A method for enforcing a computing device power policy by a computing device, comprising:
generating a power policy;
sending the power policy to a managed node over a network;
receiving a suspicious process alert from the managed node across the network, wherein the suspicious process alert indicates a process that has been designated a suspicious process;
determining whether to terminate the suspicious process; and
sending a process termination command if it is determined to terminate the suspicious process.

12. The method of claim 11, further comprising:
receiving a usage record; and
generating an energy consumption report based on the usage record.

13. The method of claim 12, further comprising adjusting the energy consumption report based on a consumption factor adjustment.

14. The method of claim 11, further comprising sending the power policy according to one selected from a group consisting of a deployment schedule and a policy group.

15. The method of claim 11, wherein determining whether to terminate the suspicious process is based on a received input.

16. A method for complying with a computing device power policy by a computing device, comprising:
receiving a power policy via a network;
determining whether to enter a power save mode based on the power policy and any suspicious process, and if it is determined to enter the power save mode, then:
entering the power save mode;
determining whether to enter an active mode; and
entering the active mode if it is determined to enter the active mode.

17. The method of claim 16, wherein the computing device is disconnected from the network after receiving the power policy.

18. The method of claim 16, further comprising:
monitoring usage; and
sending usage information.

19. The method of claim 16, wherein determining whether to enter the power save mode based on the power policy and any suspicious process comprises:
determining whether it is time to enter the power save mode;
determining whether a process is running that prevents entering power save mode if it is time to enter a power save mode;
determining whether the process is a sensitive process if the process is running that prevents entering power save mode;
determining whether to terminate the process if the process is not the sensitive process; and
terminating the process if it is determined to terminate the process.

20. The method of claim 19, wherein if it is determined that the process is not the sensitive process, then the instructions are further executable to send a suspicious process alert.

* * * * *